(12) United States Patent
Endara et al.

(10) Patent No.: US 12,446,923 B1
(45) Date of Patent: Oct. 21, 2025

(54) FIXATOR DISTRACTION CLAMP ASSEMBLY

(71) Applicants: Christopher D. Endara, Palmetto, FL (US); Matthew J. Endara, Palmetto Bay, FL (US)

(72) Inventors: Christopher D. Endara, Palmetto, FL (US); Matthew J. Endara, Palmetto Bay, FL (US)

( * ) Notice: Subject to any disclaimer, the term of this patent is extended or adjusted under 35 U.S.C. 154(b) by 0 days.

(21) Appl. No.: 18/734,198

(22) Filed: Jun. 5, 2024

(51) Int. Cl.
    *A61B 17/66*    (2006.01)
    *A61B 17/64*    (2006.01)

(52) U.S. Cl.
    CPC .......... *A61B 17/66* (2013.01); *A61B 17/6466* (2013.01)

(58) Field of Classification Search
    CPC ............................ A61B 17/6466; A61B 17/66
    See application file for complete search history.

(56) References Cited

U.S. PATENT DOCUMENTS

| | | | |
|---|---|---|---|
| 1,471,451 | A | 10/1923 | Crimp |
| 1,618,715 | A | 2/1927 | Lammers et al. |
| 2,485,169 | A | 10/1949 | Roeschke |
| 3,802,303 | A | 4/1974 | Evans et al. |
| 4,541,422 | A | 9/1985 | de Zbikowski |
| 4,620,533 | A | 11/1986 | Mears |
| 4,840,094 | A | 6/1989 | Macor |
| 4,856,386 | A | 8/1989 | Rodriguez |
| 4,882,958 | A | 11/1989 | McNeeley |
| 4,895,141 | A | 1/1990 | Koeneman et al. |
| 5,157,995 | A | 10/1992 | Nogues |
| 5,356,411 | A | 10/1994 | Spievack |
| 5,358,504 | A | 10/1994 | Paley et al. |
| 5,829,328 | A | 11/1998 | Chen |
| 6,022,348 | A | 2/2000 | Spitzer |
| 6,269,717 | B1 | 8/2001 | Bollinger |
| 6,409,729 | B1 | 6/2002 | Martinelli et al. |
| 6,565,564 | B2 | 5/2003 | Hoffman et al. |
| 6,637,298 | B1 | 10/2003 | O'Brien et al. |
| 7,041,103 | B2 | 5/2006 | Hoffman-Clair et al. |
| 7,048,735 | B2 | 5/2006 | Ferrante et al. |
| 7,334,506 | B2 | 2/2008 | Hui |
| 7,699,848 | B2 | 4/2010 | Hoffman et al. |
| 7,722,609 | B2 | 5/2010 | Bordeaux |
| 7,931,650 | B2 | 4/2011 | Winquist et al. |

(Continued)

FOREIGN PATENT DOCUMENTS

CN           102350678       6/2013

*Primary Examiner* — Sameh R Boles
(74) *Attorney, Agent, or Firm* — MALLOY & MALLOY, PL

(57) ABSTRACT

A fixator distraction clamp assembly designed to enable orthopedic practitioners to precisely set, alter, and maintain the alignment of deformed bones. The assembly features innovative components with specialized surface geometries—such as wave surface patterns, valley and ridge members on corresponding convex and concave surfaces, and ridged and grooved surfaces on corresponding angular adjustments. These geometries, combined with a central shaft, spring, and nut arrangement, allow the assembly to adopt distinct tensioned, partially tensioned, and un-tensioned positions. These geometries and positions thus facilitate granular adjustments of a fixator necessary for precise bone alignment while ensuring the overall stability of the assembly.

16 Claims, 12 Drawing Sheets

(56) References Cited

U.S. PATENT DOCUMENTS

| | | |
|---|---|---|
| 8,361,120 B2 | 1/2013 | Gabelberger et al. |
| 8,403,928 B2 | 3/2013 | Bordeaux |
| 8,734,446 B2 | 5/2014 | Miller |
| 8,752,455 B1 | 6/2014 | Taylor, Jr. |
| 8,758,343 B2 | 6/2014 | Maughan et al. |
| 9,272,395 B2 | 3/2016 | Hui |
| 9,539,029 B1 | 1/2017 | Muniz et al. |
| 9,549,762 B2 | 1/2017 | Thomke et al. |
| 9,848,912 B1 | 12/2017 | Endara et al. |
| 10,478,224 B1 | 11/2019 | Endara et al. |
| 2002/0037193 A1 | 3/2002 | Gibbons et al. |
| 2006/0229604 A1 | 10/2006 | Olsen et al. |
| 2006/0287652 A1 | 12/2006 | Lessig et al. |
| 2007/0038217 A1 | 2/2007 | Brown et al. |
| 2007/0198012 A1 | 8/2007 | Thomke et al. |
| 2008/0041193 A1 | 2/2008 | Baker |
| 2009/0078093 A1 | 3/2009 | Suski, Jr. et al. |
| 2009/0299368 A1 | 12/2009 | Bauer |
| 2009/0306661 A1 | 12/2009 | Thomke et al. |
| 2009/0326532 A1 | 12/2009 | Schulze |
| 2010/0262143 A1 | 10/2010 | Bordeaux |
| 2010/0298827 A1 | 11/2010 | Cremer et al. |
| 2011/0066151 A1 | 3/2011 | Murner et al. |
| 2011/0087226 A1 | 4/2011 | Murner et al. |
| 2012/0004659 A1 | 1/2012 | Miller et al. |
| 2012/0089142 A1* | 4/2012 | Mullaney ............ A61B 17/6466 606/54 |
| 2012/0150181 A1 | 6/2012 | Dorawa et al. |
| 2012/0150182 A1 | 6/2012 | Dominik et al. |
| 2012/0209264 A1 | 8/2012 | Zandona et al. |
| 2013/0165931 A1 | 6/2013 | Bordeaux |
| 2014/0251091 A1 | 9/2014 | Hui |
| 2016/0038185 A1 | 2/2016 | Disegi et al. |

* cited by examiner

FIXATOR DISTRACTION CLAMP ASSEMBLY

BACKGROUND

Field

The present disclosure relates generally to medical hardware designed for the stabilization and healing of broken or deformed bones. More specifically, the present disclosure pertains to structures associated with the connectors, hinges, and/or joints used in conjunction with or on clamps of fixators, which generally additionally comprise connectors, hinges, joints, rods, and/or pins. As such, the present disclosure provides an assembly that assists with the diagnosis and treatment of bone displacements or abnormalities, enhancing the treatment's effectiveness.

DESCRIPTION OF THE RELATED ART

External fixators are pivotal in modern orthopedic medicine, particularly for managing complex fractures and correcting orthopedic deformities/breakages. These devices work by externally stabilizing deformed/fractured bones through a configuration of rods, pins, clamps, connectors, and joints that penetrate the skin and affix to the bone. The stability provided by the external fixator is crucial for the proper alignment and healing of bone segments.

Among the components of an external fixator, a clamp's connector's hinges, and/or joints play a fundamental role. These elements allow for the dynamic adjustment of the device, accommodating movements necessary for the correct anatomical realignment of bones. The couplers, hinges, and/or joints of a fixator's clamp(s) facilitate the rotational and angular positioning of rods, pins, and other couplers, hinges, and/or joints (some of which are not a part of or directly connected to clamps), which are crucial for maintaining the proper orientation of bone fragments during the healing/realignment process. This ability to adjust and fine-tune the device is essential, as it directly impacts the mechanical conditions at the fracture site, influencing both healing/realignment speed and quality.

Precision in the movement and adjustment of these components is paramount. The healing process of bones, particularly in cases of complex fractures or corrections of deformities, depends heavily on the exact mechanical environment provided by the fixator. Slight deviations from the optimal alignment can lead to improper healing, resulting in malunions or non-unions, which are scenarios where the bones heal incorrectly or fail to heal, respectively. The precision of movements allowed by the couplers, hinges, and/or joints in an external fixator can significantly affect the outcome of the healing process.

However, current technologies in external fixators often fall short in providing the required precision for optimal bone healing. Many existing devices have limitations in their range of motion, the granularity of their adjustments, or the stability of their hold once positioned. These limitations can lead to difficulties in achieving and maintaining the precise alignment needed for effective bone healing. The inability to finely adjust the position or to secure that position against movement under normal treatment can compromise the healing process.

As such, there is a pressing need in the field of orthopedic medicine for advancements in the design and functionality of external fixators. Specifically, there is a demand for an assembly that allows for more precise, controlled movements and adjustments using the device's clamp's couplers, hinges, and/or joints. Such improvements would provide orthopedic practitioners with the ability to more accurately set and maintain the position of fractured/deformed bones, enhancing the healing outcomes and reducing the likelihood of complications.

While external fixators are indispensable tools in the treatment of fractures and orthopedic corrections, the current limitations in their design—particularly in the mechanisms that allow for precise adjustments—underscore a significant gap in medical technology. There exists a crucial need for innovative solutions that address these shortcomings, enhancing the precision and effectiveness of external fixation and thereby improving patient outcomes in orthopedic care.

SUMMARY

The present disclosure provides for an innovative assembly that allows for precise adjustments of a fixator's distraction clamp assembly and the multiple components thereof so as to allow orthopedic practitioners with the ability to more accurately set and maintain the position of fractured/deformed bones. Further, the instant assembly, described as a fixator distraction clamp assembly herein, allows for a device that is able to maintain stability while allowing for granular, controlled levels of adjustments.

As such, the present disclosure provides for a fixator distraction clamp assembly that can comprise a pin clamp assembly, at least one convex pivot configured and dimensioned to adjustably secure to the pin clamp assembly, at least one female flat angular adjustment comprising a concave pivot configured and dimensioned to adjustably engage with said at least one convex pivot, at least one rod holder comprising a male flat angular adjustment configured and dimensioned to adjustably engage with said at least one female flat angular adjustment. The at least one convex pivot may further comprise a wave pattern surface, at least one guide pin emanating from the wave pattern surface, and a convex peak and valley patterned surface that is diametrically opposed to the wave pattern surface. In turn, the pin clamp assembly can comprise at least one wave pattern surface configured and dimensioned to receive the wave pattern surface of the at least one convex pivot. Moreover, the pin clamp can comprise at least one guide track configured and dimensioned to receive the at least one guide pin of the at least one convex pivot.

Continuing, the at least one female flat angular adjustment's concave pivot can comprise a concave peak and valley patterned surface that is configured and dimensioned to adjustably engage and correspondingly align with at least one convex pivot's convex peak and valley patterned surface to allow the female flat angular adjustment to travel about the at least one convex pivot.

For context, the at least one female flat angular adjustment's concave peak and valet patterned surface may be diametrically opposed to a female flat angular adjustment surface wherein the female flat angular adjustment surface may comprise at least one groove. Thus, the at least one male flat angular adjustment may comprise a male flat angular adjustment surface with at least one ridge configured and dimensioned to fill the at least one groove of the female flat angular adjustment surface.

Further, the fixator distraction clamp assembly may additionally comprise at least one central shaft, at least one spring, and at least one nut. As such, the pin clamp may further comprise at least one shaft track, where the at least one convex pivot may further comprise a pass-through aperture, where the at least one female flat angular adjustment may further comprise a pass-through aperture, and where the at least one rod holder may further comprise a pass-through aperture. Notably, the pass-through aperture of the at least one convex pivot may be of a diameter larger than the pass-through aperture of the at least one female flat angular adjustment. As such, the central shaft may thus pass through the at least one shaft track of the pin clamp assembly, pass-through aperture of the at least one convex pivot, pass-through aperture of the at least one female flat angular adjustment, the spring, and the pass-through aperture of the at least one rod holder.

The at least one female flat angular adjustment may further comprise a channel configured and dimensioned to receive at least one coil of the spring and the at least one rod holder may also comprise a channel configured and dimensioned to receive at least one coil of the spring (wherein the coil received by the rod holder is opposite the coil received by the at least one female flat angular adjustment). As such, the at least one central shaft, the at least one spring, and the at least one nut may be configured and dimensioned to be selectably positioned between a fully tensioned position, partially tensioned position, and un-tensioned position, each position altering the orientation and functionality of the fixator distractor clamp and its associated components.

In the fully tensioned position, the at least one central shaft, at least one spring, and at least one nut may secure and conjoin the at least one wave pattern surface of the pin clamp assembly to the wave pattern surface of the at least one convex pivot. In addition, the guide pins may be inserted into and affixed within the pin clamp's guide tracks. Further, the at least one central shaft, at least one spring, and at least one nut may adjustably engage and align the at least one female flat angular adjustment's concave peak and valley patterned surface to the at least one convex pivot's convex peak and valley patterned surface (which bars the at least one female flat angular adjustment from rotating about the at least one convex pivot), and, in addition, conjoin the female flat angular adjustment surface to the male angular adjustment surface wherein the at least one ridge of the female flat angular adjustment surface is filled by the at least one groove, barring the male angular adjustment from rotating about the at least one female flat angular adjustment.

In the partially tensioned position, the at least one central shaft, at least one spring, and at least one nut may secure and conjoin the at least one wave pattern surface of the pin clamp assembly to the wave pattern surface of the at least one convex pivot. In addition, the guide pins may be inserted into and affixed within the pin clamp's guide tracks. Further, the at least one central shaft, at least one spring, and at least one nut may adjustably engage and align the at least one female flat angular adjustment's concave peak and valley patterned surface to the at least one convex pivot's convex peak and valley patterned surface (which bars the at least one female flat angular adjustment from rotating about the at least one convex pivot), yet conjoin the female flat angular adjustment surface to the male angular adjustment surface where at least one ridge May rotate out of at least one groove and into another at least one groove, allowing the male angular adjustment to rotate about the at least one female flat angular adjustment.

The un-tensioned position allows the at least one convex pivot to move about the pin clamp assembly while retaining the at least one guide pin in the at least one guide track, allow the at least one female flat angular adjustment's concave peak and valley patterned surface to come out of contact with and rotate about the convex peak and valet patterned surface, and allow the female flat angular adjustment surface to come out of contact with and rotate about the male angular adjustment surface. As for the spring, it may be additionally configured and dimensioned to apply an anti-tensioning force to the at least one female flat angular adjustment and the at least one rod holder (so as to allow for the above-mentioned positions), as well as be additionally configured and dimensioned to apply a tensioning force from the at least one female flat angular adjustment unto the at least one convex pivot (again, allowing for the above-mentioned positions).

These and other objects, features and advantages of the present invention will become clearer when the drawings as well as the detailed description are taken into consideration.

BRIEF DESCRIPTION OF THE DRAWINGS

For a fuller understanding of the nature of the present disclosure, reference should be had to the following detailed description taken in connection with the accompanying drawings in which.

DETAILED DESCRIPTION

Figure 1:
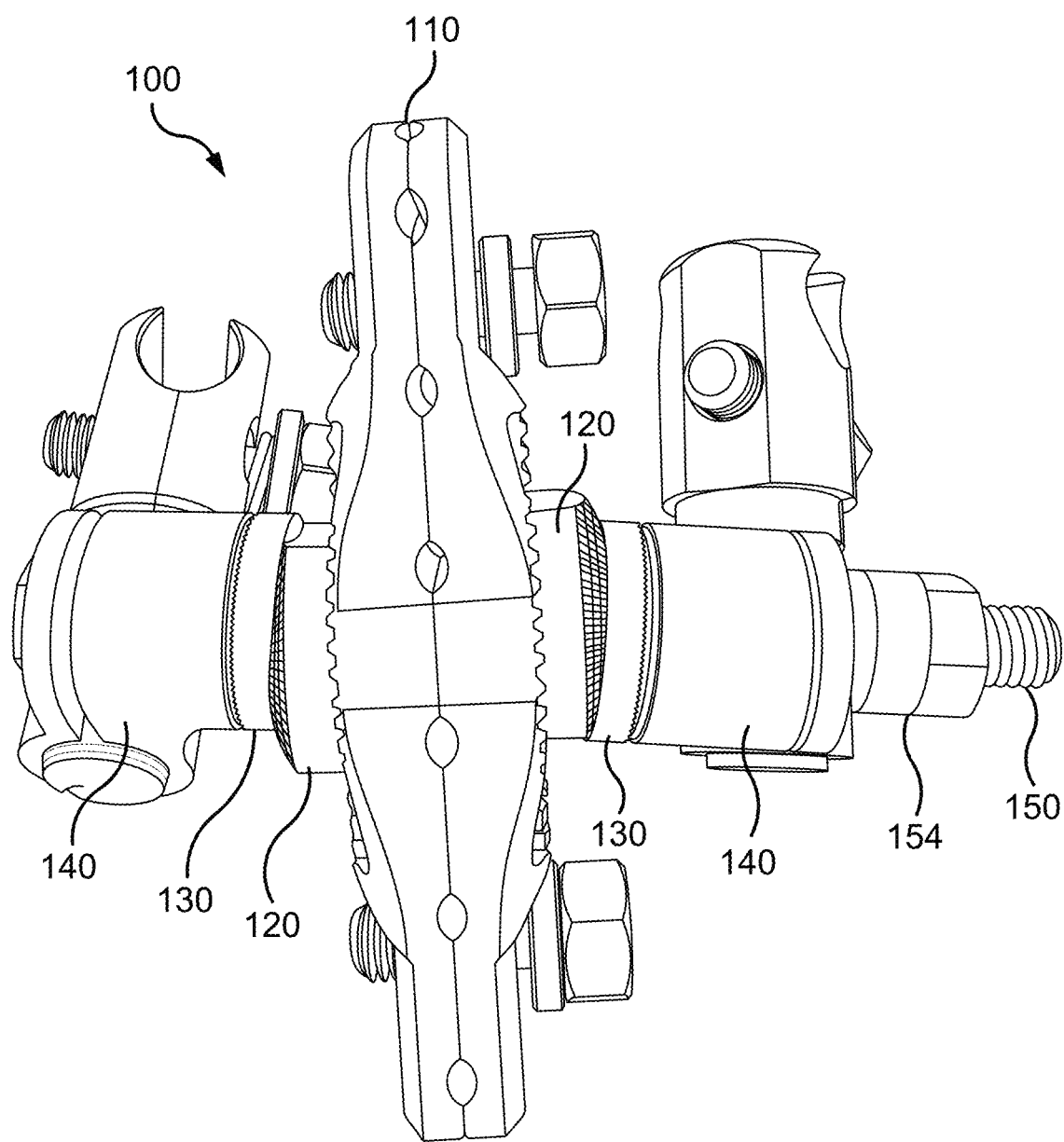
FIG. 1 is a perspective view of a fixator distraction clamp assembly.

With reference now to FIG. 1, the figure depicts a perspective view of a fixator distraction clamp assembly 100. Present in the figure is the assembly's 100 pin clamp assembly 110 (which may be adjustably conjoined/assembled by at least one bolt or fastener that is inserted into the pin clamp assembly 110 so as to allow the pin clamp assembly 110 to secure pins which may be inserted into bone), two convex pivots 120, two female flat angular adjustments 130, two rod holders 140, a central shaft 150, and a nut 154 (which may be 6-13 mm). As may be apparent from FIG. 1, it would appear one side of the pin clamp assembly 110 is a mirror image of the other side. However, distinct from a pure mirror image, it may be noted that a bolt (described as a central shaft 150) can enter on the left side of the pin clamp assembly 110 and exits on the right side thereof (with a nut 154 on the central shaft 150 on one side of the pin clamp assembly 110). In addition, a fixator distraction clamp assembly need not appear as having a mirror image of components about the pin clamp assembly 110. Indeed, a fixator distraction clamp assembly 100 may have only one of each of the aforementioned components. However, for purposes of this disclosure, the assembly 100 will be described and depicted as having one side of the pin clamp assembly 110 as a mirror image of the other side herein. As such, to gain more insight into the multiple functions, features, and positionings of a fixator distraction clamp assembly 100, reference may first be had to other figures.

Figure 5:
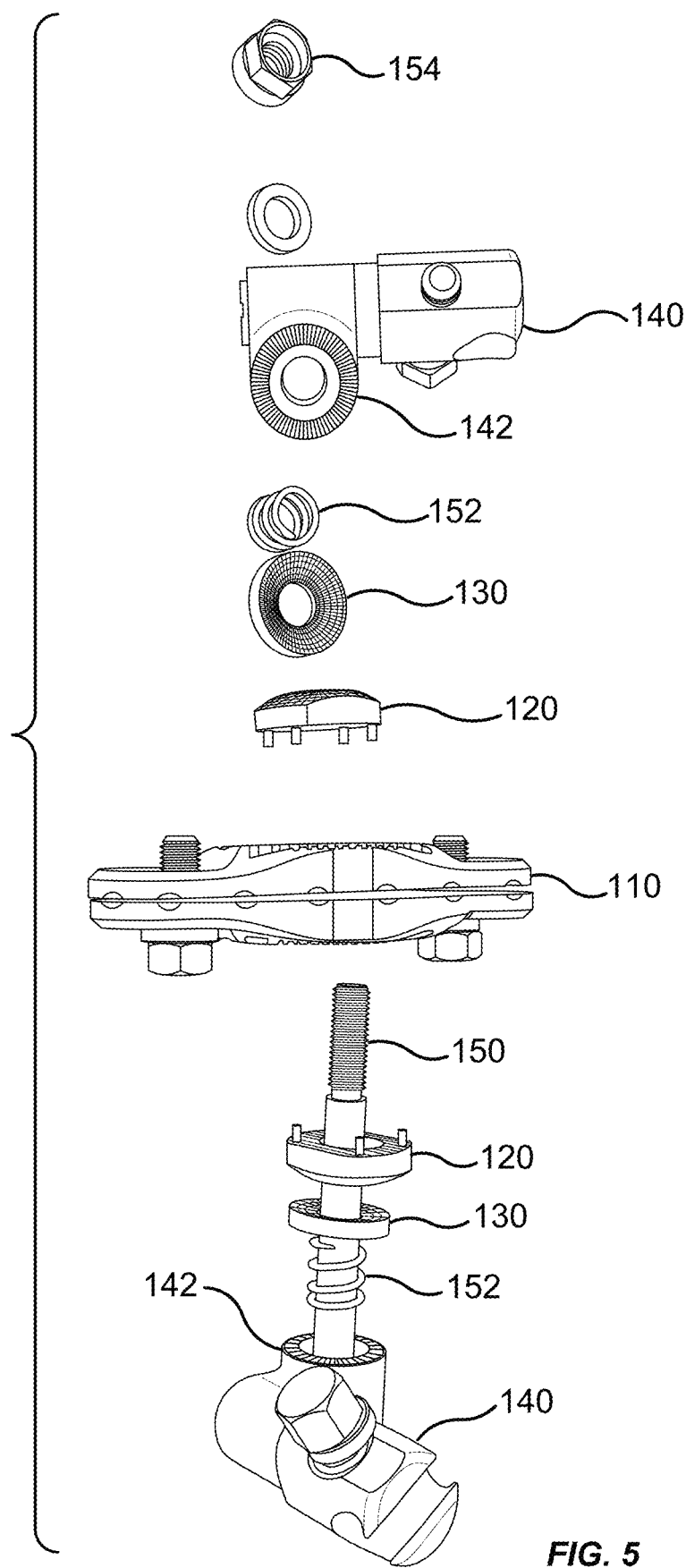
FIG. 5 is an exploded perspective view of a fixator distraction clamp assembly.

For example, with reference to FIG. 5, FIG. 5 is a mostly exploded perspective view of a fixator distraction clamp assembly. At the top or left side of the Figure, a nut 154 can be seen, along with a washer (unlabeled). The nut 154 and washer rest above a rod holder 140, which can comprise a male flat angular adjustment 142 (among other elements). Next is a spring 152, which can be placed between the rod holder 140 and the female flat angular adjustment 130. Moreover, the rod holder 140 may have a channel 143 configured and dimensioned to receive at least one coil of the spring 152 where the female flat angular adjustment 130 may also have a channel 133 to receive the opposite at least one coil of the spring 152. Further, visible is a convex pivot 120 and a pin clamp assembly 110.

Below or to the right of the pin clamp assembly 110, many of the same aforementioned elements (but for the washer and nut 154) can be seen oriented about a central shaft 150. As such, with reference now back to FIG. 1, it should be apparent that the central shaft 150 penetrates elements such as the rod holders 140, springs 152, female flat angular adjustments 130, convex pivots 120, and pin clamp assembly 110. With this in mind, it should also be apparent that the nut 154 secures or adjustably tensions the aforementioned elements between the ends of the central shaft 150.

Figure 6:
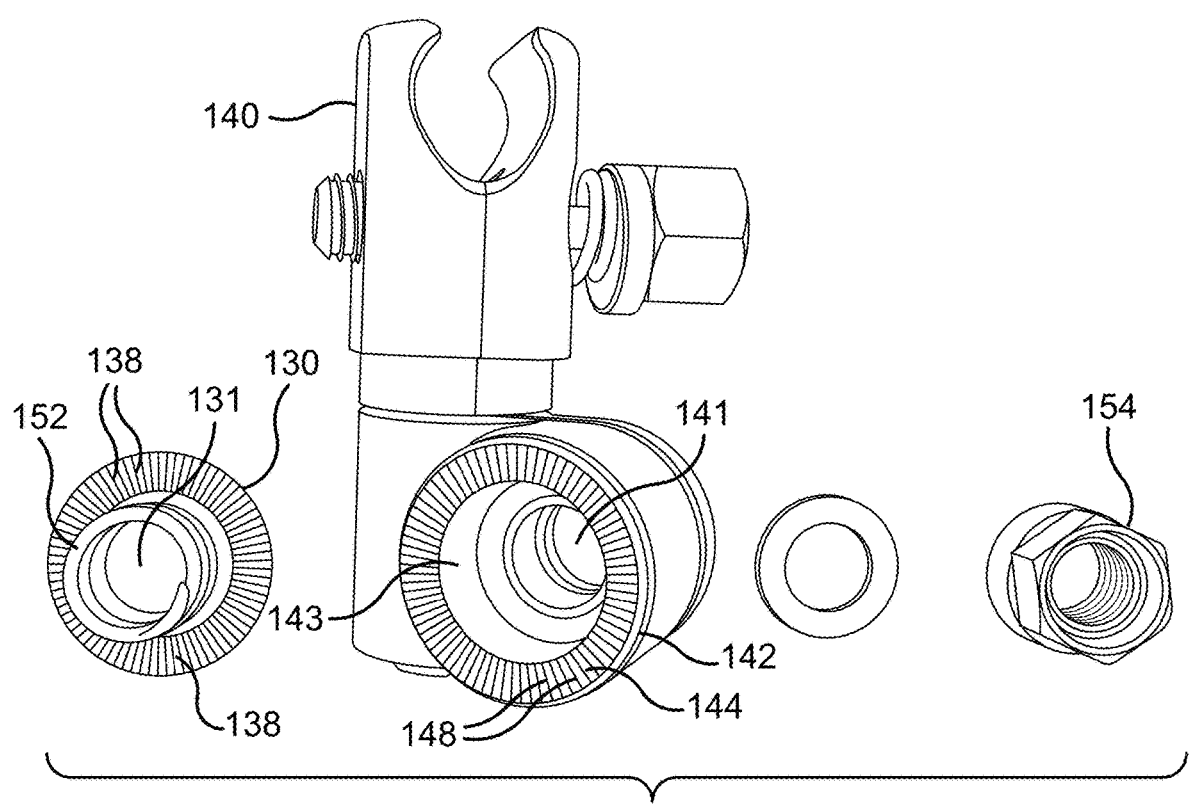
FIG. 6 is a perspective view of some components of a fixator distraction clamp assembly.

For more context, with reference to FIG. 6, the female flat angular adjustment 130, spring 152, rod holder 140, washer (unlabeled), and nut 154 may be seen, as well as specific features on each. With reference to the female flat angular adjustment 130, the adjustment 130 may have two sides with distinct features. One side may have a concave pivot 132 (not depicted in FIG. 6), whereas the other side may have a female flat angular adjustment surface 136 with at least one groove 138 thereon/therein. In addition, the adjustment 130 may have a pass-through aperture 131 therein so as to allow at least one central shaft 150 to pass through the adjustment 130. Further, on the side with a female flat angular adjustment surface 136, the adjustment 130 may have a channel 133 so as to allow the spring 152 to be at least partially inserted into the adjustment 130 and have at least one of the spring's 152 coils rest on a lip or surface of the adjustment 130 within the channel 133. This channel 133 and lip or surface of the adjustment 130 will be described in subsequent detail.

Considering the rod holder 140 as is shown in FIG. 6, the rod holder may have a rod holder structure itself (unlabeled) that moves between a freely rotating state or a locked state to hold a rod in place, a pass-through aperture 141 (to allow a central shaft 150 to pass through the aperture), a male flat angular adjustment 142, which provides the structure for a male flat angular adjustment surface 144 and structure for a rod holder channel 143 (which is to allow the spring 152 to be at least partially inserted into the rod holder 140/male flat angular adjustment 142 and have at least one coil rest on a lip or surface within the channel 143), and at least one ridge 148 that is located on the male flat angular adjustment surface 144.

Figure 7:
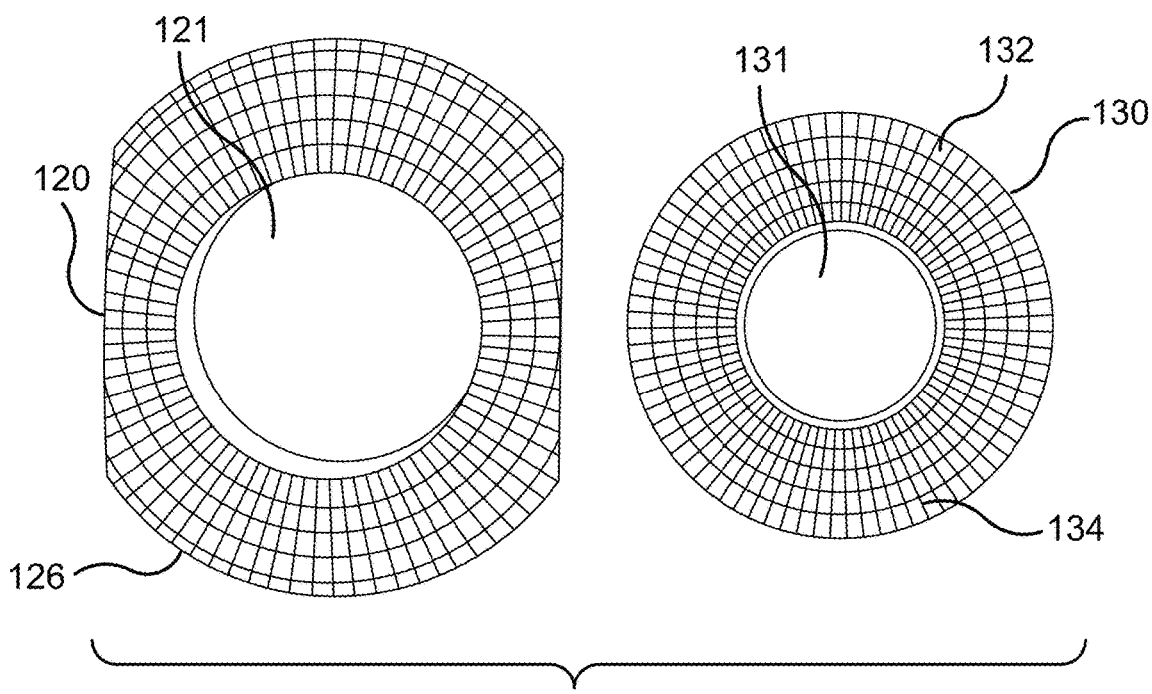
FIG. 7 is a top view of a convex pivot and a female flat angular adjustment.
Figure 8:
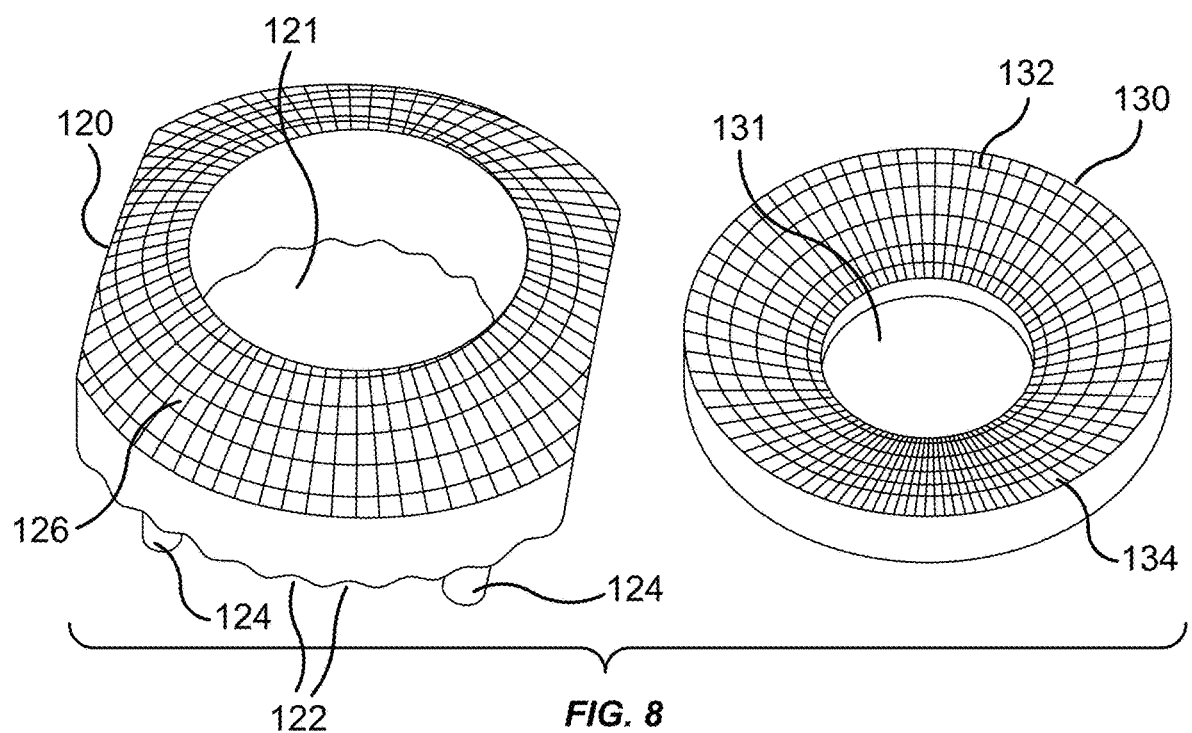
FIG. 8 is a perspective view of a convex pivot and female flat angular adjustment.

Now with reference to FIGS. 7 and 8, these figures depict a convex pivot 120 and a female flat angular adjustment 130. As may be apparent, these figures depict the other side/surface of the female flat angular adjustment 130 as is depicted in FIG. 6. As such, the concave pivot 132 which comprises the concave peak and valley patterned surface 134 of the female flat angular adjustment 130 is visible. The pass-through aperture 131 can also be seen.

Considering the convex pivot 120, the pivot 120 may comprise a convex peak and valley surface 126 that is geometrically configured and dimensioned to receive a concave peak and valley surface 136 and allow the adjustment 130 to move about the convex peak and valley surface 126 when the adjustment 130 is placed atop the pivot 120 in an un-tensioned position/state (as will be described in more detail). Still considering the convex pivot 120, the pivot 120 may comprise two sides, each with unique surfaces. On the side opposite the convex peak and valley surface 126 may be a wave pattern surface 122 with guide pins 124 emanating therefrom (brief reference may be had to FIGS. 10 and 11 to visualize the wave pattern surface 122 and guide pins). This wave pattern surface 122 may connect with and correspond to a wave pattern surface of the pin clamp assembly 110, where the guide pins emanating from the pivot 120 may also correspond to a guide track of the pin clamp assembly 114. Further, the pivot 120 may comprise a pass-through aperture to allow for a central shaft 150 to pass through the aperture 121. Notably, the aperture 121 of the pivot 120 may have a larger diameter than that of the female flat angular adjustment 130 to allow the central shaft 150 to move about within the pivot 120 but not the adjustment 130 when the central shaft 150 passes through each. In turn, this movement of the central shaft 150 exerts forces upon the adjustment 130, which would generally allow the adjustment 130 to move about the surface of the pivot 120 while the pivot 120 remains in place.

Figure 9:
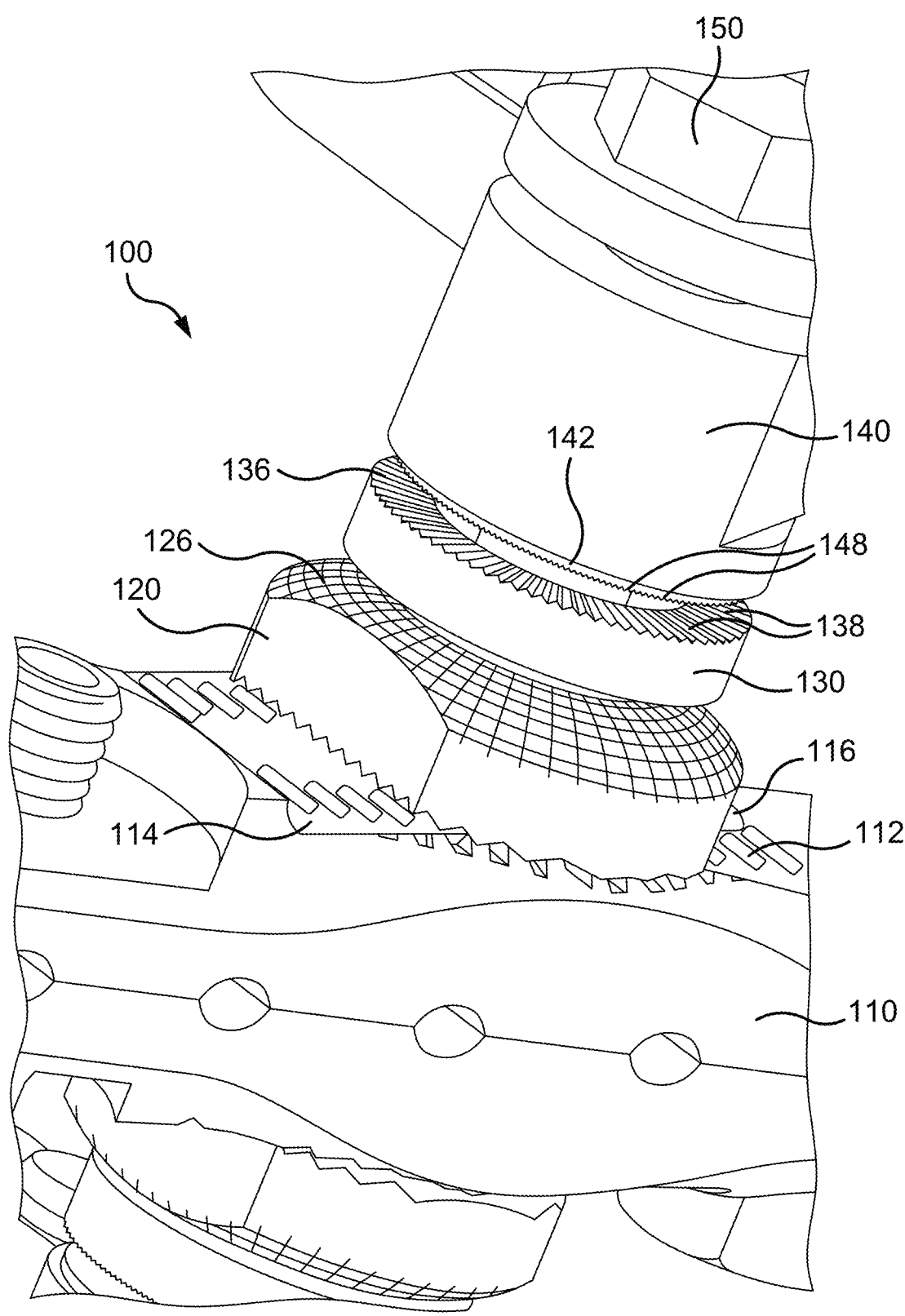
FIG. 9 is a perspective view of a portion of a fixator distraction clamp assembly in an un-tensioned position.
Figure 10:
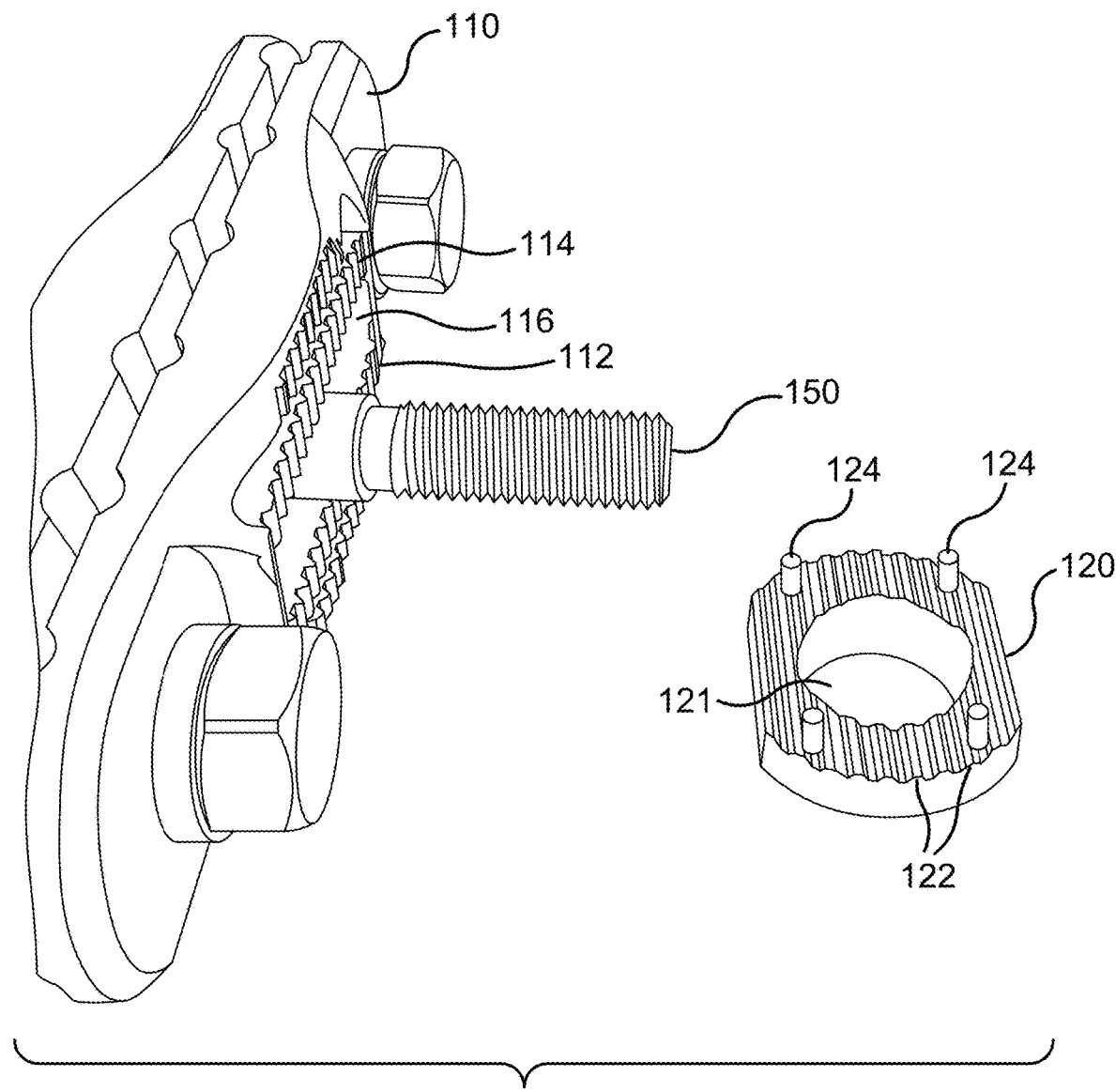
FIG. 10 is a perspective view of some components of a fixator distraction clamp assembly.
Figure 11:
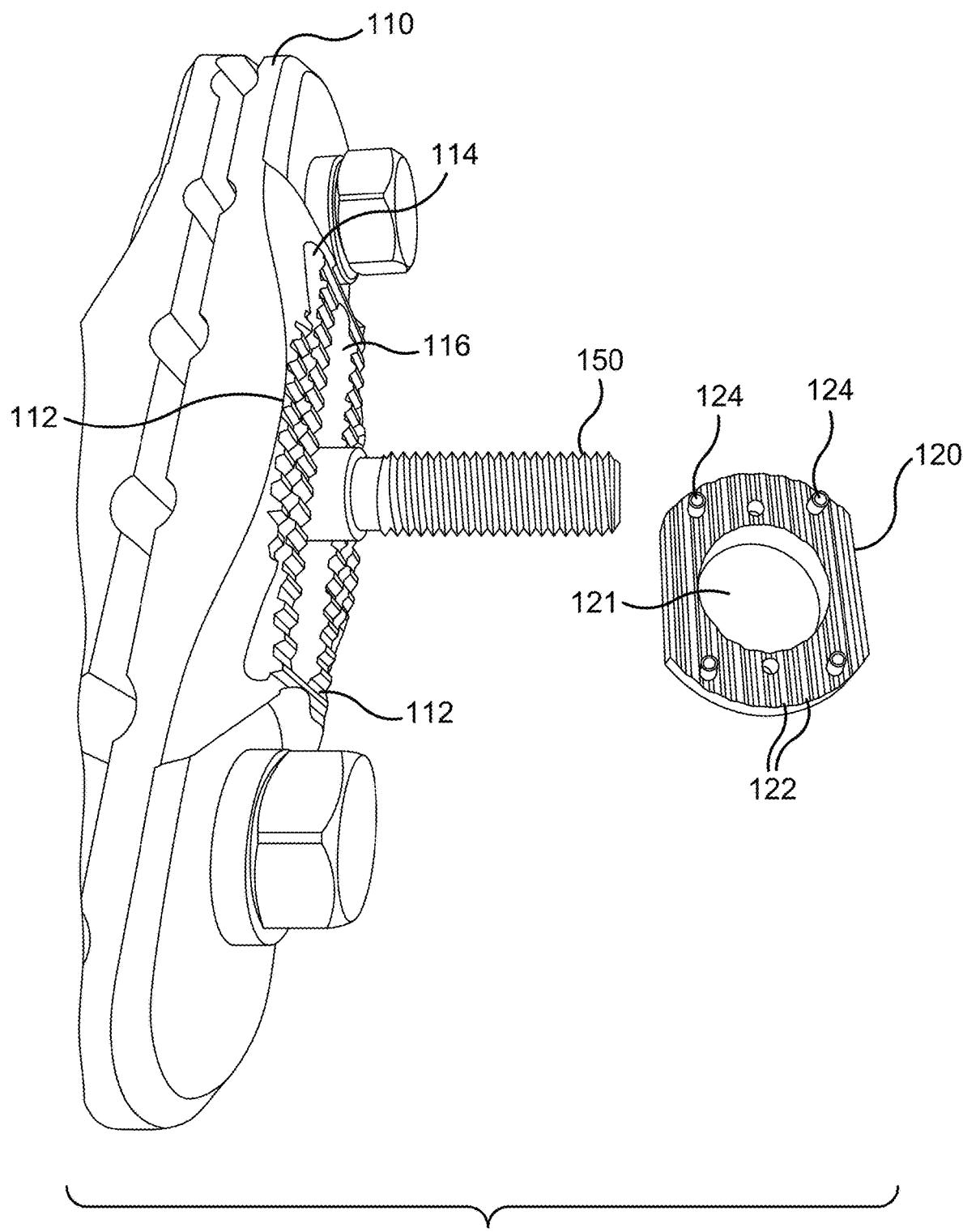
FIG. 11 is an alternative perspective view of the components of a fixator distraction clamp assembly in FIG. 10.
Figure 12:
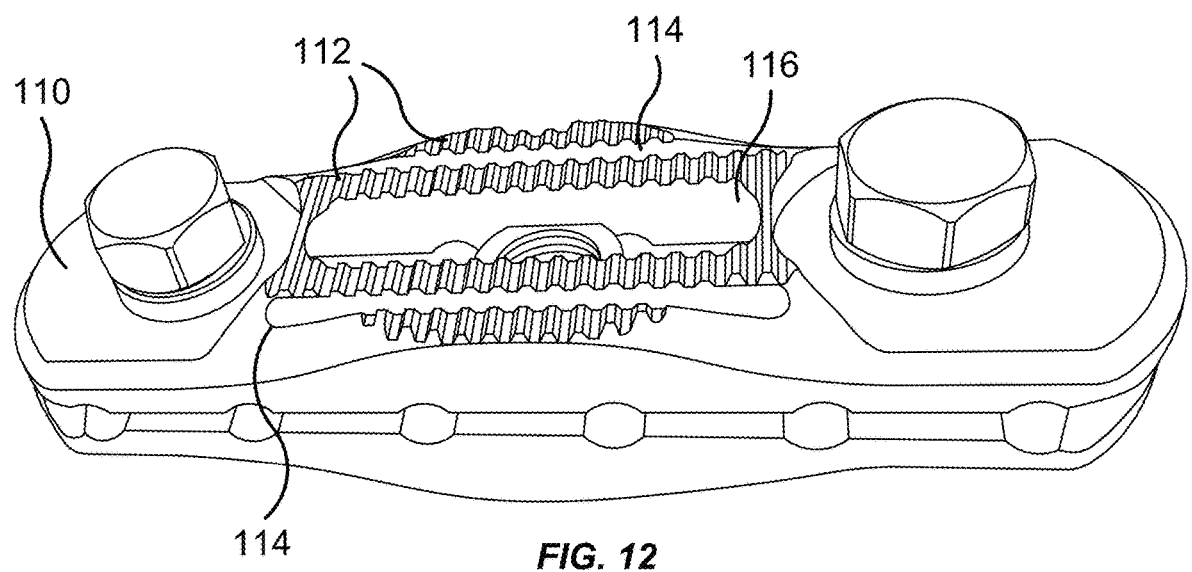
FIG. 12 is a perspective view of a component of a fixator distraction clamp assembly.

For more context, reference may now be had to FIG. 9. The figure depicts the instant assembly 100 in a partially assembled state or un-tensioned position (as will be described in more detail). As such, FIG. 9 is an up-close view of the instant assembly's pin clamp 110 having at least one central shaft 150 running through it and the convex pivot 120, the female flat angular adjustment 130, the spring 152 (not depicted), and the rod holder 140. In addition, FIG. 9 depicts how the pin clamp 110 has a wave pattern surface 112 that is aligned with the wave pattern surface 122 of the convex pivot 120 in addition to how the guide pins 124 may be inserted into the guide track of the pin clamp assembly 114. As such, it may be noted that the guide pins 124 retain the convex pivot 120 along a lateral track of the pin clamp assembly 110 whereas the wave pattern surfaces 112/122 prevent the lateral movement of the pivot 120 along the assembly 110 (at least when in a partially tensioned or fully tensioned position, as will be described). Reference to FIGS. 10, 11, and 12 may be had to view and understand how the immediately aforementioned elements may be oriented and features associated therewith. That said, FIGS. 10-12 additionally depict a shaft track of the pin clamp assembly 116, which allows for the central shaft 150 to penetrate the pin clamp assembly 110. Notably, the shaft track 116 may retain the central shaft 150 in a laterally and horizontally locked position by preventing the central 150 shaft from moving laterally and horizontally.

Figure 2:
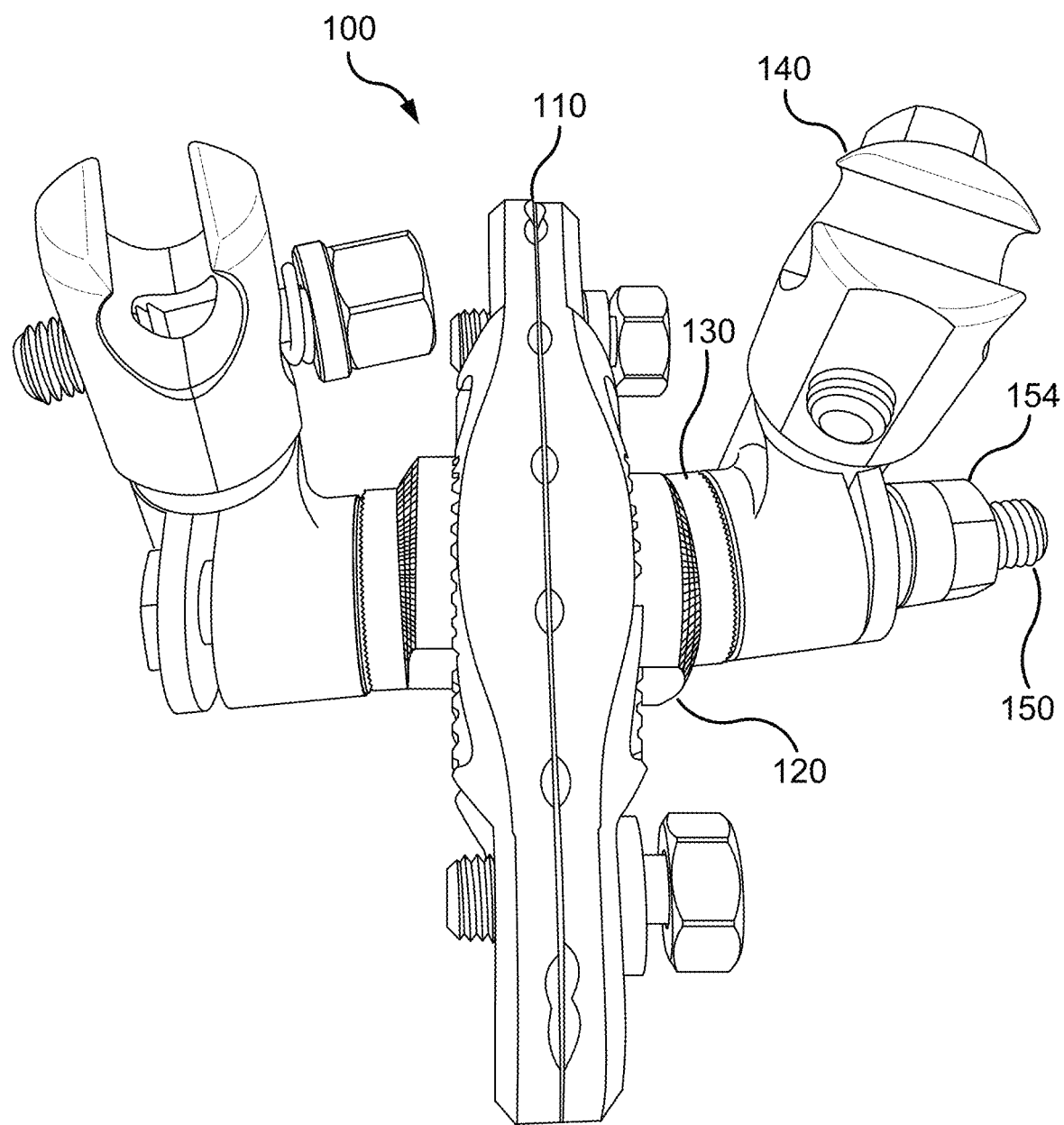
FIG. 2 is a perspective view of a fixator distraction clamp assembly in a fully tensioned position.

With continued reference to FIG. 9, the convex pivot 120 can also be referenced wherein the convex peak and valley surface 126 may be seen. As previously mentioned, the concave peak and valley surface 134 may be configured and dimensioned to rest atop the convex surface. Notably, each surface 126/134 may comprise a slotted surface that forms valleys of structures wherein the non-slotted surfaces act as peaks. This unique surface geometry thus allows the female flat angular adjustment 130 to move about the surface of the convex pivot 120 yet be restricted from rotational movement about the convex pivot (at least when the instant assembly 100 is in a partially tensioned or fully tensioned position, as will be described). For a depiction of this feature, reference may be had to noticing the difference in the positioning of the female flat angular adjustments 130 in FIGS. 1 and 2. In FIG. 1, the left side female flat angular adjustment 130 is raised above the left convex pivot 120 whereas the right side adjustment 130 is neutral or slightly below the right convex pivot 120. However, in FIG. 2, without rotating, the left side female flat angular adjustment 130 moved to slightly below the left convex pivot 120 whereas the right side adjustment 130 (again, without rotating) is above the right convex pivot 120. What also allows for this movement is that the pass-through aperture 121 of the convex pivot 120 is larger in diameter (allowing for central shaft 150 movement within the aperture 121) than the pass-through aperture 131 of the female flat angular adjustment 130. It should be noted that although both FIGS. 1 and 2 depict the instant assembly 100 in a fully tensioned position, to have traversed from the orientations of the adjustment 130 and pivot 120, as described above, the assembly 100 may have had its tensioning position adjusted out of a fully tensioned position (as will be described).

With continued reference to FIG. 9, it can be seen that the female flat angular adjustment 130 may be placed between the convex pivot 120 and the rod holder 140 (the spring 152 being between the female flat angular adjustment 130 and the rod holder 140). As such, the female flat angular adjustment 130 may have a surface 136 wherein at least one groove 138 (but may have a set of grooves) is present on the surface 136 and the rod holder 140 may have a male flat angular adjustment 142 with a surface 144 that comprises at least one ridge 148. The at least one ridge 148 (or set of ridges 148) may be configured and dimensioned to rest within the at least one groove 138 (or set of grooves 138). When this occurs, the rod holder 140 and the male flat angular adjustment 142 may not be able to rotate about the female flat angular adjustment 130 and vice versa (at least when the instant assembly 100 is in a specific position/positioning, as will be described). However, a ridge 148 may be slightly lifted or positioned out of the groove 138, yet the surfaces 136/144 still maintaining contact so as to allow the rod holder 140 and the male flat angular adjustment 142 to rotate about the female flat angular adjustment 130 and vice versa (again, at least when the instant assembly 100 is in a specific position/positioning, as will be described).

As such, considering the above, it should be apparent that the wave pattern surfaces 112 prevent the lateral movement of the convex pivot 120 about the pin clamp assembly (at least when the instant assembly 100 is in a partially tensioned or fully tensioned position), the peak and valley surfaces 126/134 prevent rotational movement of the adjustment 130 about the convex pivot (at least when the instant assembly 100 is in a partially tensioned or fully tensioned position), and the ridge 148 and groove members 138 of the surfaces 136/144 prevent the rotational movement of the female flat angular adjustment 130 about the rod holder/fat male angular adjustment 142 or vice versa (at least when the instant assembly 100 is in a fully tensioned position). As can be seen from the figures, the movements that may be allowed by the aforementioned elements allow for granular, precise movements of the assembly.

Therefore, the instant assembly 100 may be selectably positioned, via the assistance of the at least one central shaft 150, at least one spring 152, and at least one nut 154, between a fully tensioned position, partially tensioned position, and un-tensioned position. As may be apparent, these positionings allow a user of the assembly 100 or practitioner using the device 100 to make fine adjustments while the assembly 100 is in use, or allow for a fixator device to be slightly adjusted, while maintaining stability and structural rigidity.

As such, with reference to FIGS. 1 and 2, these figures depict the instant assembly 100 in a fully tensioned position. The nut 154 is threaded fully along the central shaft 150, compressing each of the elements between the nut 154 and an end of the central shaft 150. In turn, each female flat angular adjustment's 130 surface 136 with at least one groove 138 has a rod holder's 140 male flat angular adjustment's 142 surface 144 at least one ridge 148 inserted into the at least one groove 138. This orientation and positioning bars or otherwise prevents the rotational movement of the female flat angular adjustment 130 about the male flat angular adjustment 144. Continuing, this position allows for the compression of the female flat angular adjustment 130 against the convex pivot 120, wherein the concave pivot's 132 concave peak and valley patterned surface 134 is oriented and aligned with the convex pivot's 120 convex peak and valley surface 126 (the peaks of the convex pivot's 120 surface 126 aligned within the valleys of the concave pivot's 132 surface 134 and the peaks of the concave pivot's 132 surface 134 aligned with the valleys of the convex pivot's 120 surface 126). In turn, this orientation may prevent both the rotational movement and/or lateral movement of the female flat angular adjustment 130 about the convex pivot 120. Notably, the geometry of the peak and valley surfaces 126/134 may be altered so as to in some cases, only prevent the rotational movement of the female flat angular adjustment 130 about the convex pivot, or, in other cases, prevent the lateral movement of the female flat angular adjustment 130 about the convex pivot (in other cases, preventing both rotational and lateral movement). In addition, this position can allow for the compression of the convex pivot 120 against the pin clamp assembly 110. In turn, the wave pattern surface on the convex pivot 122 aligns with the wave pattern surface on the pin clamp assembly 112 so as to prevent the lateral movement of the convex pivot 120 about the pin clamp assembly 110. In addition, the guide pins emanating from the wave pattern surface on the convex pivot 124 may be placed within the guide track of the pin clamp assembly 114 for preventing the rotation of the convex pivot 120 about the pin clamp assembly 110.

Figure 3:
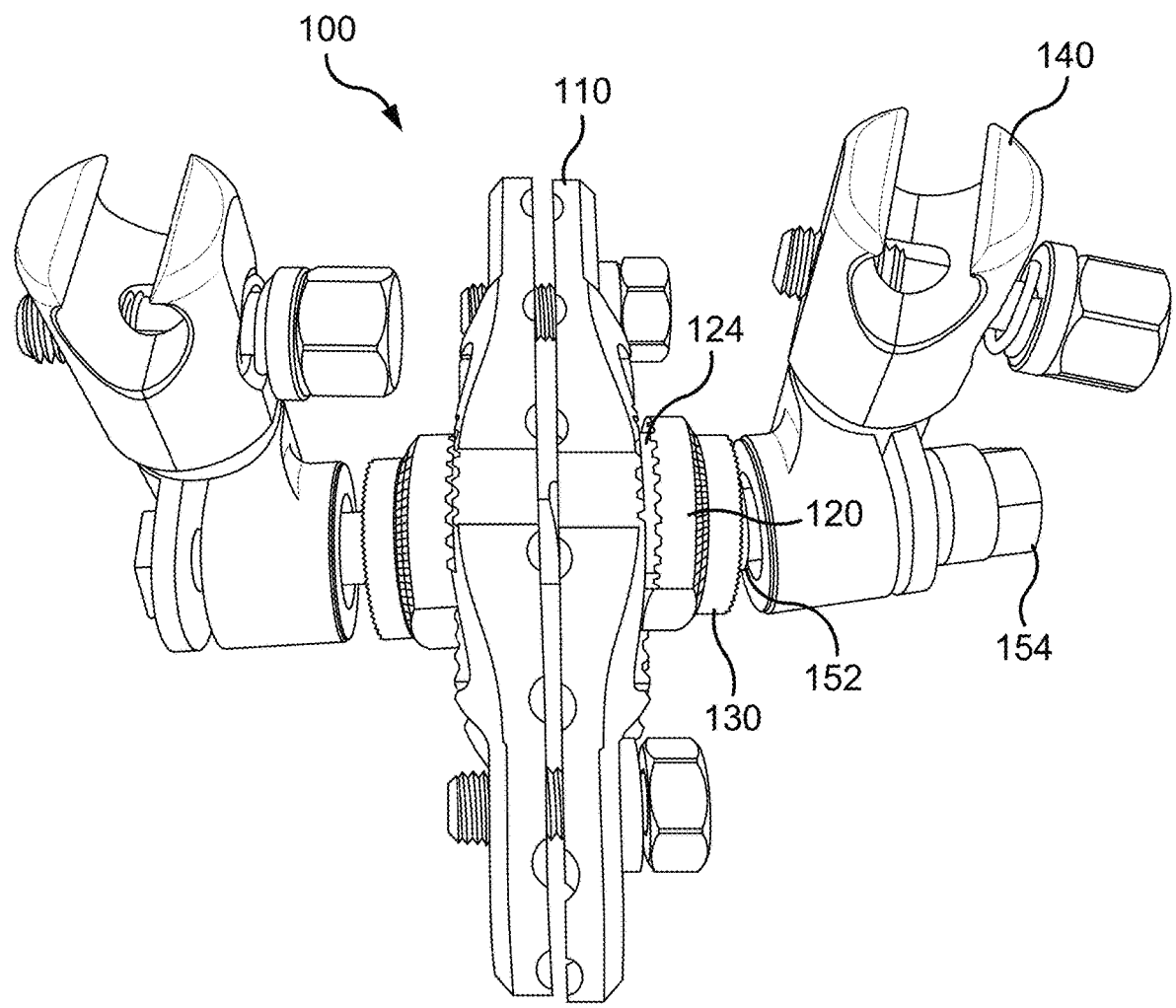
FIG. 3 is a perspective view of a fixator distraction clamp assembly in an un-tensioned position.

With reference now to FIG. 3, this figure depicts the instant assembly 100 in an un-tensioned position. The nut 154 has only begun to be threaded along the central shaft 150, leaving each of the elements between the nut 154 and an end of the central shaft 150 uncompressed. In turn, each female flat angular adjustment's 130 surface 136 with at least one groove 138 does not have a rod holder's 140 male flat angular adjustment's 142 surface 144 at least one ridge 148 inserted into the at least one groove 138. This orientation and positioning does not bar nor otherwise prevent the rotational movement of the female flat angular adjustment 130 about the male flat angular adjustment 144. Continuing, this position allows for no compression of the female flat angular adjustment 130 against the convex pivot 120, wherein the concave pivot's 132 concave peak and valley patterned surface 134 are not oriented and aligned with the convex pivot's 120 convex peak and valley surface 126. In turn, this orientation does not prevent the rotational movement and/or lateral movement of the female flat angular adjustment 130 about the convex pivot 120. In addition, this position does not allow for the compression of the convex pivot 120 against the pin clamp assembly 110. In turn, the wave pattern surface on the convex pivot 122 does not align with the wave pattern surface on the pin clamp assembly 112, allowing for the lateral movement of the convex pivot 120 about the pin clamp assembly 110. In addition, the guide pins emanating from the wave pattern surface on the convex pivot 124 may be placed within the guide track of the pin clamp assembly 114, but are also free to move out of the track 114.

Figure 4:
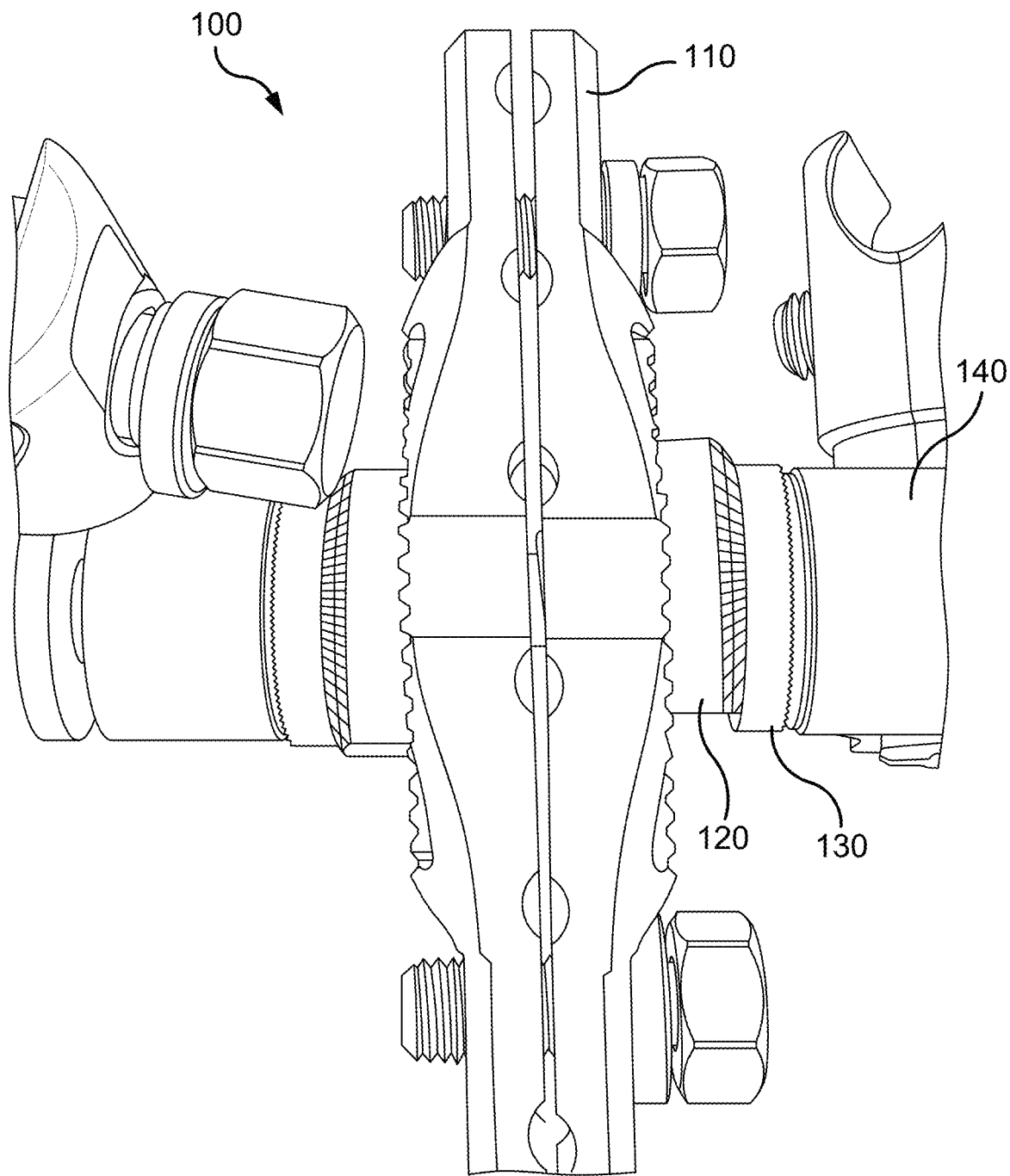
FIG. 4 is a perspective view of a portion of a fixator distraction clamp assembly in a partially tensioned position.

As such, with reference to FIGS. 4, this figure depicts the instant assembly 100 in a partially tensioned position. The nut 154 has transitioned from its "screwed down" orientation in the fully tensioned position (reference may be had to FIGS. 1 and 2) to being slightly unscrewed from such a position. This allows for the elements along the central shaft 150 to the shaft to still remain compressed, but less so when compared to a fully tensioned position. As such, each female flat angular adjustment's 130 surface 136 with at least one groove 138 has a rod holder's 140 male flat angular adjustment's 142 surface 144 at least one ridge 148 inserted into the at least one groove 138. However, the spring 152, having one coil on a surface within the female flat angular adjustment channel 133 and the rod holder channel 143, exerts an anti-tensioning or anti-compressive force between the female flat angular adjustment 130 and rod holder 140 (and its male flat angular adjustment surface 144). In turn, the at least one ridge 148 may move out of one groove 138 and into another groove 138 via the rotation of the rod holder 140 by a user of the instant assembly 140. While the surfaces 136/144 still remain in contact, this allows for the rod holder 140 to rotationally move in an arc length equal to the distance between at least one ridge being inserted into at least one groove 138 and being removed therefrom and rotated into another groove 138. As such, while this partially tensioned orientation and positioning bars or otherwise prevents the rotational movement of the female flat angular adjustment 130 about the male flat angular adjustment 144, a user may rotate the road holder 140 in increments equal to the distance between grooves. Such a positioning allows for the granular adjustment of the rod holders 140 and instant assembly 100 as a whole. Continuing, this position allows for the compression of the female flat angular adjustment 130 against the convex pivot 120, wherein the concave pivot's 132 concave peak and valley patterned surface 134 is oriented and aligned with the convex pivot's convex peak and valley surface 126 (the peaks of the convex pivot's 120 surface 126 aligned within the valleys of the concave pivot's 132 surface 134 and the peaks of the concave pivot's 132 surface 134 aligned with the valleys of the convex pivot's 120 surface 126). Notably, the spring 152 again applies a tensioning or additional compressive force. In turn, this orientation May prevent both the rotational movement and/or lateral movement of the female flat angular adjustment 130 about the convex pivot 120. Notably, the geometry of the peak and valley surfaces 126/134 may be altered so as to in some cases, only prevent the rotational movement of the female flat angular adjustment 130 about the convex pivot, or, in other cases, prevent the lateral movement of the female flat angular adjustment 130 about the convex pivot (in other cases, preventing both rotational and lateral movement). In addition, this position can allow for the compression of the convex pivot 120 against the pin clamp assembly 110. In turn, the wave pattern surface on the convex pivot 122 aligns with the wave pattern surface on the pin clamp assembly 112 so as to prevent the lateral movement of the convex pivot 120 about the pin clamp assembly 110. In addition, the guide pins emanating from the wave pattern surface on the convex pivot 124 may be placed within the guide track of the pin clamp assembly 114 for preventing the rotation of the convex pivot 120 about the pin clamp assembly 110.

Figure 13:
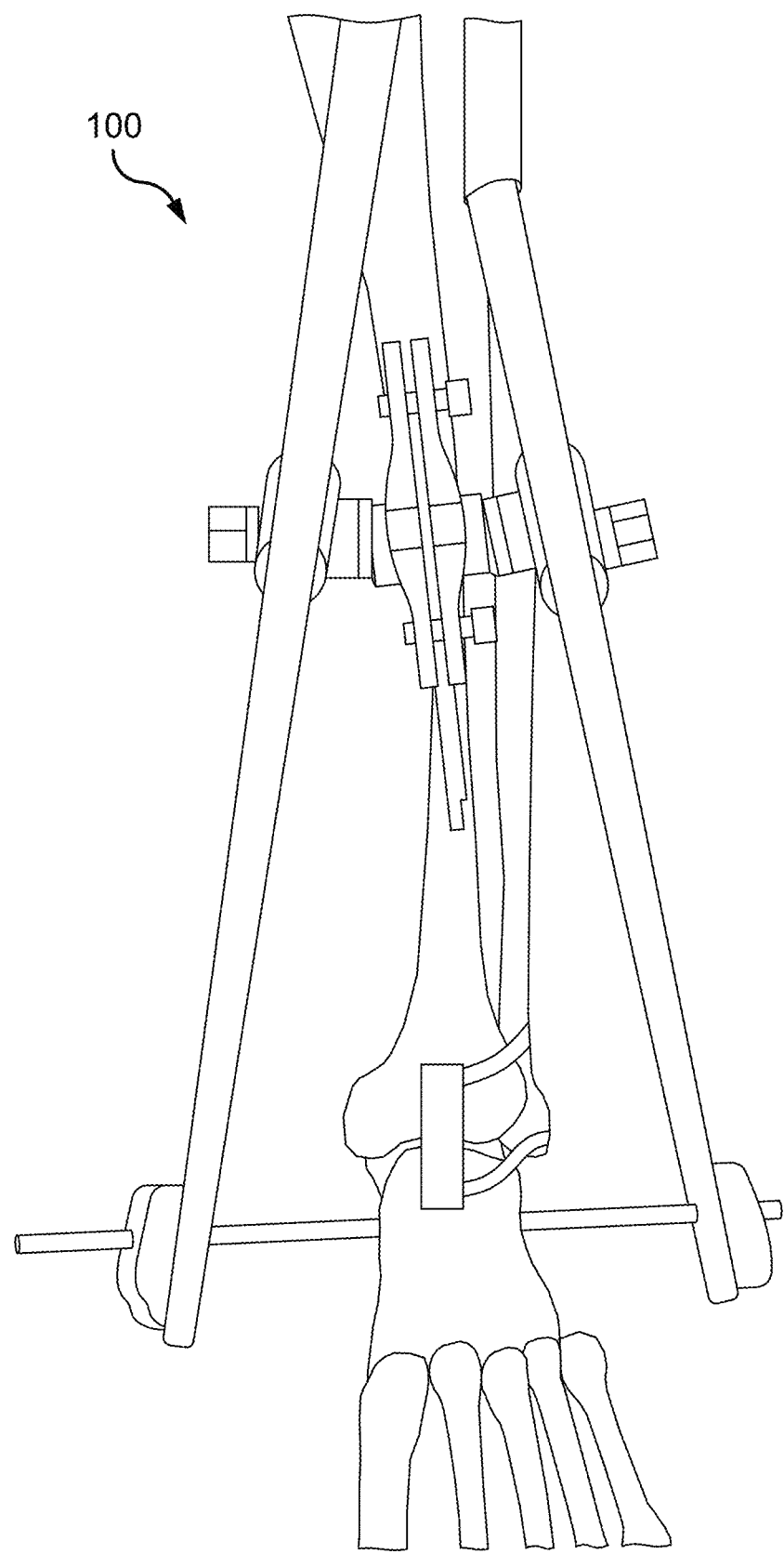
FIG. 13 is a perspective view of how a fixator distraction clamp assembly may be used. Like reference numerals refer to like parts throughout the several views of the drawings.

With brief reference to FIG. 13, the figure displays an example of the assembly 100 being used as part of a fixator F for a tibia bone B fracture. In FIG. 9, rods of the fixator are seen extending vertically away from the assembly 100 (albeit at different angles, as the instant assembly so allows through the use of the rod holders).

The following provides for an example of one use for the instant assembly. A patient arrives at the hospital with a tibial fracture. The medical team decides to use the Fixator Distraction Clamp Assembly 100 for external stabilization. Initially, the assembly is set up by placing pins in the bone of the patient and aligning/affixing the pin clamp assembly 110 to the pins. The pin camp assembly 100, combined with the central shaft 150, ensures that all elements are in place, ready for precise adjustments.

The central shaft 150, running through the assembly has the nut 154 initially tightened to a fully tensioned position to set up the assembly 100 and its components in a proper alignment for the treatment of the bone. As the healing progresses or when the fixator is attached, the assembly 100 can be adjusted to accommodate changes in bone alignment. The assembly 100 can transition into a partially tensioned position via the loosening of the nut 154. This adjustment allows the spring 152 to exert a calculated anti-tensioning force, reducing the compressive force but still maintaining alignment and compression. In this position, the ridge 148 can disengage from one groove 138 and move to an adjacent groove 138. Notably, this movement may be facilitated by an external user rotating the rod holder 140 (or a portion thereof), by gravity naturally pulling the bone, or by the bone naturally re-aligning itself. In addition and similarly, the unique geometry of the convex and concave peak and valley patterned surfaces 126 and 134 allow the female flat angular adjustment 130 to move laterally (albeit slightly) about the convex pivot 120.

Throughout the treatment, the medical team monitors the healing process, making further adjustments to the tensioner assembly as necessary. The flexibility to shift between fully tensioned, partially tensioned, and un-tensioned positions allows the surgeon to respond to changes in swelling, healing rates, and other clinical factors effectively.

With the ability to make precise adjustments, the Fixator Distraction Clamp Assembly 100 enhances the healing outcomes by ensuring that the bone heals in the correct alignment. This precision reduces the risk of malunions or non-unions, common complications in traditional external fixation methods.

Upon successful healing of the bone, the external fixator and fixator distraction clamp assembly 100, is removed. The precision in adjustments offered by the assembly ensures that the bone heals correctly aligned and functional, minimizing the patient's recovery time and improving overall outcomes.

Since many modifications, variations and changes in detail can be made to a fixator distraction clamp assembly, it is intended that all matters in the foregoing description and shown in the accompanying drawings be interpreted as illustrative and not in a limiting sense.

What is claimed is:

1. A fixator distraction clamp assembly comprising:
a pin clamp assembly;
at least one convex pivot configured and dimensioned to adjustably secure to said pin clamp assembly;
at least one female flat angular adjustment comprising a concave pivot configured and dimensioned to adjustably engage with said at least one convex pivot; and
at least one rod holder comprising a male flat angular adjustment configured and dimensioned to adjustably engage with said at least one female flat angular adjustment, and said at least one convex pivot further comprising a wave pattern surface, at least one guide pin emanating from said wave pattern surface, and a convex peak and valley patterned surface diametrically opposed to said wave pattern surface.

2. The fixator distraction clamp assembly of claim 1 wherein said pin clamp assembly comprises a wave pattern surface configured and dimensioned to receive said wave pattern surface of said at least one convex pivot and wherein said pin clamp comprises at least one guide track configured and dimensioned to receive said at least one guide pin of said at least one convex pivot.

3. The fixator distraction clamp assembly of claim 2 wherein said at least one female flat angular adjustment's said concave pivot comprises a concave peak and valley patterned surface configured and dimensioned to adjustably engage and correspondingly align with said at least one convex pivot's convex peak and valley patterned surface to allow said at least one female flat angular adjustment to travel about said at least one convex pivot.

4. The fixator distraction clamp assembly of claim 3 wherein said at least one female flat angular adjustment's said concave pivot's said concave peak and valley patterned surface is diametrically opposed to a female flat angular adjustment surface, said female flat angular adjustment surface comprising at least one groove.

5. The fixator clamp assembly of claim 4 wherein said at least one male flat angular adjustment comprises a male flat angular adjustment surface with at least one ridge configured and dimensioned to fill said at least one groove of said female flat angular adjustment surface.

6. The fixator distraction clamp assembly of claim 5 additionally comprising at least one central shaft, at least one spring, and at least one nut.

7. The fixator distraction clamp assembly of claim 6 wherein said pin clamp assembly further comprises at least one shaft track, said at least one convex pivot further comprises a pass-through aperture, said at least one female flat angular adjustment further comprises a pass-through aperture, and said at least one rod holder further comprises a pass-through aperture.

8. The fixator distraction clamp assembly of claim 7 wherein said pass-through aperture of said at least one convex pivot is of a diameter larger than said pass-through aperture of said at least one female flat angular adjustment.

9. The fixator distraction clamp assembly of claim 8 wherein said central shaft passes through said at least one shaft track of said pin clamp assembly, said pass-through aperture of said at least one convex pivot, said spring, said pass-through aperture of said at least one female flat angular adjustment, and said pass-through aperture of said at least one rod holder comprising a male flat angular adjustment.

10. The fixator distraction clamp assembly of claim 9 wherein said at least one female flat angular adjustment comprising a concave pivot further comprises a channel configured and dimensioned to receive at least one coil of said spring and wherein said at least one rod holder comprising a male flat angular adjustment further comprises a channel configured and dimensioned to receive at least one coil of said spring opposite to the at least one coil of said spring said at least one female flat angular adjustment's said channel is configured and dimensioned to receive.

11. The fixator distraction clamp assembly of claim 10 wherein said at least one central shaft, said at least one spring, and said at least one nut are configured and dimensioned to be selectably positioned between a fully tensioned position, partially tensioned position, and un-tensioned position.

12. The fixator distraction clamp assembly of claim 11 wherein said fully tensioned position allows said at least one central shaft, said at least one spring, and said at least one nut to secure and conjoin said at least one wave pattern surface of said pin clamp assembly to said wave pattern surface of said at least one convex pivot, adjustably engage and align said at least one female flat angular adjustment's said concave peak and valley patterned surface to said at least one convex pivot's said convex peak and valley patterned surface barring said at least one female flat angular adjustment from rotating about said at least one convex pivot, and conjoin said female flat angular adjustment surface to said male angular adjustment surface wherein said at least one ridge fills said at least one groove, barring said male angular adjustment from rotating about said at least one female flat angular adjustment.

13. The fixator distraction clamp assembly of claim 11 wherein said partially tensioned position allows said at least one central shaft, said at least one spring, and said at least one nut to secure and conjoin said at least one wave pattern surface of said pin clamp assembly to said wave pattern surface of said at least one convex pivot, adjustably engage and align said at least one female flat angular adjustment's said concave peak and valley patterned surface to said at least one convex pivot's said convex peak and valley patterned surface barring said at least one female flat angular adjustment from rotating about said at least one convex pivot, and conjoin said female flat angular adjustment surface to said male angular adjustment surface wherein said at least one ridge may rotate out of said at least one groove and into another at least one groove, allowing said male angular adjustment to rotate about said at least one female flat angular adjustment.

14. The fixator distraction clamp assembly of claim 11 wherein said un-tensioned position allows for said at least one convex pivot to move about said pin clamp assembly while retaining said at least one guide pin in said at least one guide track, allow said at least one female flat angular adjustment's said concave peak and valley patterned surface to come out of contact with and rotate about said convex peak and valet patterned surface, and allow said female flat angular adjustment surface to come out of contact with and rotate about said male angular adjustment surface.

15. The fixator distraction claim of claim 11 wherein said spring is additionally configured and dimensioned to apply an anti-tensioning force to said at least one female flat angular adjustment and said at least one rod holder.

16. The fixator distraction clamp assembly of claim 11 wherein said spring is additionally configured and dimensioned to apply a tensioning force from said at least one female flat angular adjustment to said at least one convex pivot.

* * * * *